United States Patent
Qian et al.

(10) Patent No.: US 8,410,566 B2
(45) Date of Patent: Apr. 2, 2013

(54) APPLICATION OF ELECTRICAL FIELD POWER TO LIGHT-TRANSMITTING MEDIUM

(75) Inventors: Wei Qian, Torrance, CA (US); Dazeng Feng, El Monte, CA (US); Joan Fong, San Marino, CA (US); Mehdi Asghari, Pasadena, CA (US)

(73) Assignee: Kotura, Inc., Montery Park, CA (US)

( * ) Notice: Subject to any disclaimer, the term of this patent is extended or adjusted under 35 U.S.C. 154(b) by 0 days.

(21) Appl. No.: 13/136,828

(22) Filed: Aug. 10, 2011

(65) Prior Publication Data

US 2013/0020664 A1    Jan. 24, 2013

Related U.S. Application Data

(60) Provisional application No. 61/572,841, filed on Jul. 21, 2011.

(51) Int. Cl.
| | |
|---|---|
| *H01L 27/14* | (2006.01) |
| *H01L 31/00* | (2006.01) |
| *H01L 31/0232* | (2006.01) |
| *H01L 27/15* | (2006.01) |
| *H01L 29/26* | (2006.01) |
| *H01L 31/12* | (2006.01) |
| *H01L 33/00* | (2010.01) |
| *H01L 29/267* | (2006.01) |
| *H01L 29/16* | (2006.01) |
| *H01L 29/161* | (2006.01) |
| *H01L 31/153* | (2006.01) |
| *H01L 29/165* | (2006.01) |

(52) U.S. Cl. .............. 257/432; 357/80; 357/81; 357/82; 357/83; 357/84; 357/85; 357/431; 357/436; 357/E31.102; 357/E31.109; 357/E33.076; 357/E33.077

(58) Field of Classification Search .............. 257/80–85, 257/E31.102, E31.109, E33.076, E33.077, 257/431–432, 436
See application file for complete search history.

(56) References Cited

U.S. PATENT DOCUMENTS

| | | | | |
|---|---|---|---|---|
| 4,603,420 | A * | 7/1986 | Nishizawa et al. | 372/45.01 |
| 5,742,423 | A * | 4/1998 | Ido et al. | 359/254 |
| 5,764,669 | A * | 6/1998 | Nagai | 372/46.015 |
| 5,783,844 | A * | 7/1998 | Kobayashi et al. | 257/103 |
| 6,433,399 | B1 * | 8/2002 | Polman et al. | 257/432 |
| 6,970,611 | B1 * | 11/2005 | Van Der Vliet et al. | 385/14 |
| 7,358,585 | B2 * | 4/2008 | Patel et al. | 257/454 |
| 7,394,949 | B1 * | 7/2008 | Feng et al. | 385/3 |
| 7,542,630 | B2 * | 6/2009 | Zheng et al. | 385/3 |

(Continued)

*Primary Examiner* — Ida M Soward
(74) *Attorney, Agent, or Firm* — Gavrilovich, Dodd & Lindsey, LLP

(57) ABSTRACT

A device includes an input waveguide on a base. The input waveguide guides a light signal through a light-transmitting medium to a light sensor. The light sensor includes a sensor waveguide on the base. The sensor waveguide includes a light-absorbing medium that receives the light signal from the input waveguide. The light-absorbing medium has one or more continuous doped regions that are each positioned such that an application of electrical energy to the doped regions forms an electrical field in the light-absorbing medium. One or more of the doped regions has a first portion that is located within the light-absorbing medium and a second portion located outside of the light-absorbing medium. The device also includes an electrical conductor for applying the electrical energy to one of the doped regions. The electrical conductor contacts the portion of the doped regions that is located outside of the light-absorbing medium.

19 Claims, 11 Drawing Sheets

U.S. PATENT DOCUMENTS

| | | | |
|---|---|---|---|
| 7,826,700 B2 * | 11/2010 | Knights et al. | 385/40 |
| 8,093,080 B2 * | 1/2012 | Liao et al. | 438/38 |
| 8,232,125 B2 * | 7/2012 | Hatori et al. | 438/39 |
| 8,242,432 B2 * | 8/2012 | Feng et al. | 250/227.11 |
| 2011/0142390 A1 * | 6/2011 | Feng et al. | 385/2 |
| 2011/0142391 A1 * | 6/2011 | Asghari et al. | 385/2 |
| 2011/0266422 A1 * | 11/2011 | Dong et al. | 250/227.24 |
| 2011/0310467 A1 * | 12/2011 | Feng et al. | 359/341.1 |
| 2012/0263410 A1 * | 10/2012 | Feng et al. | 385/14 |

* cited by examiner

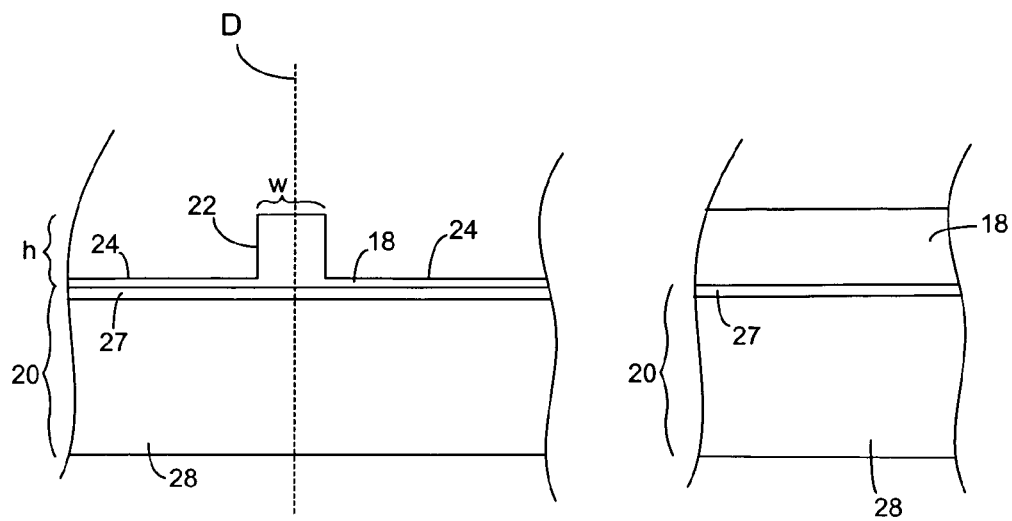
Figure 1C
Figure 1D
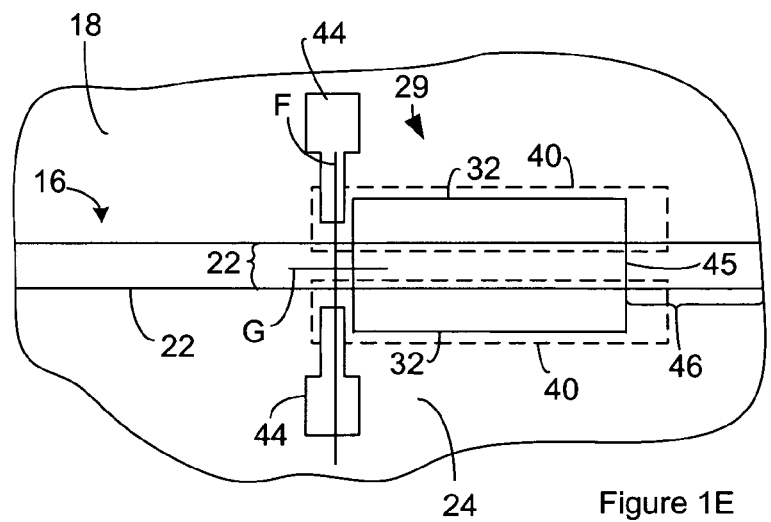
Figure 1E

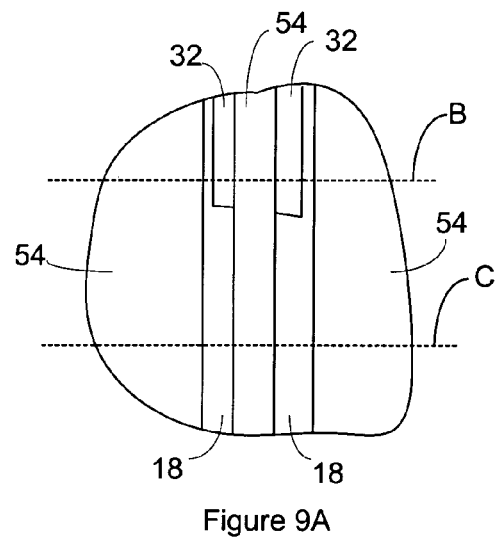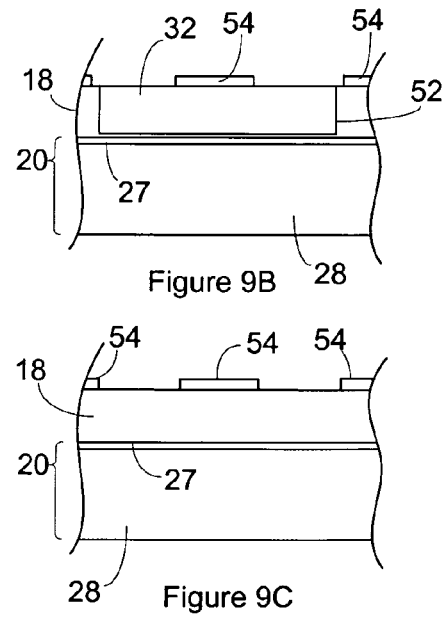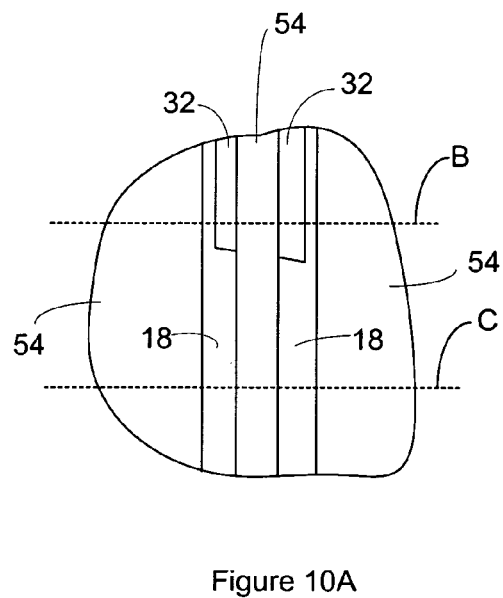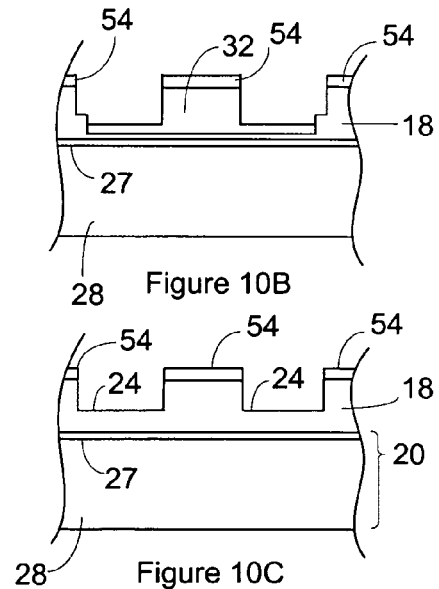
Figure 9A
Figure 9B
Figure 9C
Figure 10A
Figure 10B
Figure 10C

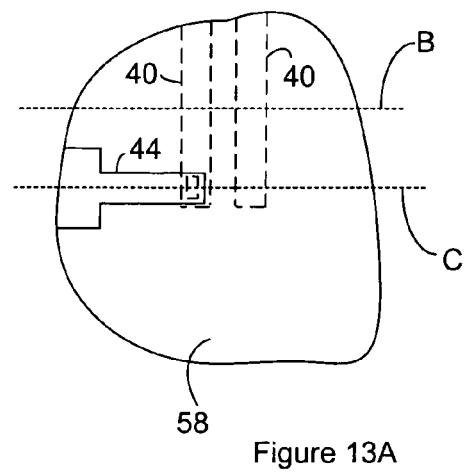
Figure 13A
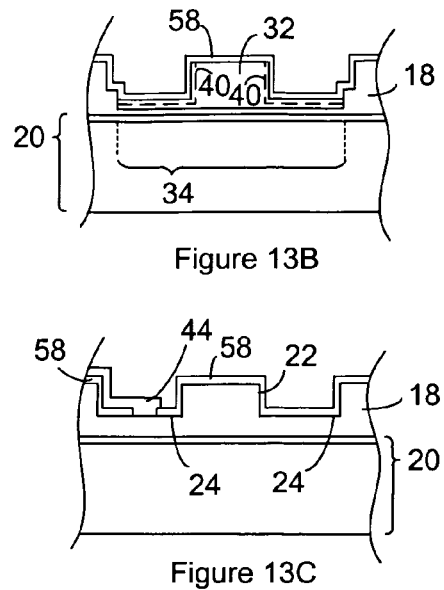
Figure 13B
Figure 13C
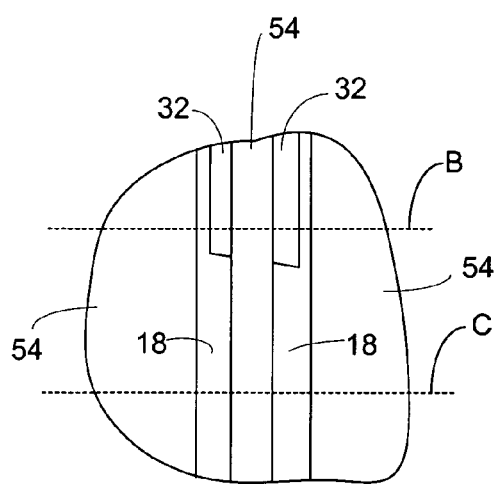
Figure 14A
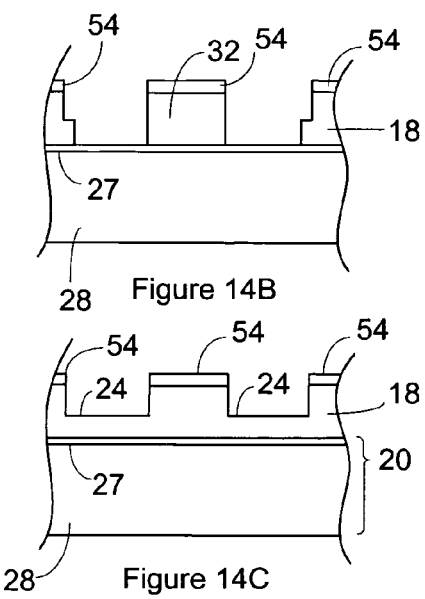
Figure 14B
Figure 14C

APPLICATION OF ELECTRICAL FIELD POWER TO LIGHT-TRANSMITTING MEDIUM

RELATED APPLICATIONS

This Application claims the benefit of U.S. Patent Application Ser. No. 61/572,841, filed on Jul. 21, 2011, entitled "Optical Device Having Light Sensor with Doped Regions," and incorporated herein in its entirety. This application is related to U.S. patent application Ser. No. 12/380,016, filed on Feb. 19, 2009, entitled "Optical Device Having Light Sensor Employing Horizontal Electrical Field," and also to U.S. patent application Ser. No. 12/584,476, filed on Sep. 4, 2009, entitled "Optical Device Having Light Sensor Employing Horizontal Electrical Field," each of which is incorporated herein in its entirety.

FIELD

The present invention relates to optical devices and more particularly to devices having a light sensor.

BACKGROUND

The use of optical and/or optoelectronic devices is increasing in communications applications. These devices can include light sensors that receive light signals from a waveguide. These light sensors often employ a light-absorbing material that absorbs the received light signals. During operation of the light sensor, an electrical field is applied across the light-absorbing material. When the light-absorbing material absorbs a light signal, an electrical current flows through the light-absorbing material. As a result, the level of electrical current through the light-absorbing material indicates the intensity of light signals being received by the light-absorbing material.

Fabricating these light sensors often includes etching the light-absorbing material so as to form one or more slabs on the light-absorbing material. However, light-absorbing materials such as germanium are often difficult to etch. For instance, it is often difficult to control the depth of the etch when etching these materials. Further, the depth of the etch can be inconsistent throughout the slab. These inconsistencies can affect the performance of these light sensors. As a result, there is a need for an improved light sensor.

SUMMARY

A device includes an input waveguide on a base. The input waveguide guides a light signal through a light-transmitting medium to a light sensor. The light sensor includes a sensor waveguide on the base. The sensor waveguide includes a light-absorbing medium that receives the light signal from the input waveguide. The light-absorbing medium has one or more continuous doped regions that are each positioned such that an application of electrical energy to the doped regions forms an electrical field in the light-absorbing medium. One or more of the doped regions has a first portion that is located within the light-absorbing medium and a second portion located outside of the light-absorbing medium. The device also includes an electrical conductor for applying the electrical energy to one of the doped regions. The electrical conductor contacts the portion of the doped regions that is located outside of the light-absorbing medium.

A method of forming a light sensor on an optical device is also disclosed. The method includes forming a sensor cavity in a light-transmitting medium positioned on a base. The sensor cavity is filled with a solid light-absorbing medium. The method also includes protecting a portion of the light-transmitting medium and a portion of the light-absorbing medium while concurrently etching the exposed light-transmitting medium and exposed light-absorbing medium so as to form a ridge that extends from within the light-transmitting medium into the light-absorbing medium. The etch etches through the exposed light-absorbing medium that is adjacent to the ridge in the light-absorbing medium.

BRIEF DESCRIPTION OF THE FIGURES

FIG. 1A through FIG. 1G illustrate an optical device having a light sensor configured to receive light signals from a waveguide. The light sensor includes field sources that are configured to generate a horizontal electrical field in a light-absorbing medium. The device illustrated in FIG. 1A through FIG. 1F employs doped regions as the field sources. FIG. 1A is a perspective view of the device.

FIG. 1B is a cross-section of the device shown in FIG. 1A taken along the line labeled B in FIG. 1A.

FIG. 1C is a cross-section of the device shown in FIG. 1A taken along the line labeled C in FIG. 1A.

FIG. 1D is a cross-section of the optical device shown in FIG. 1C taken along the line labeled D in FIG. 1C and extending parallel to the longitudinal axis of the waveguide.

FIG. 1E is a topview of the device shown in FIG. 1A.

FIG. 1F is a cross section of FIG. 1E taken along the line labeled F in FIG. 1E.

FIG. 1G is a cross section of the device shown in FIG. 1A through FIG. 1F taken along the line labeled G in FIG. 1E.

FIG. 7A through FIG. 15C illustrate methods of fabricating optical devices according to FIG. 1A through FIG. 5C.

DESCRIPTION

Figure 1A:
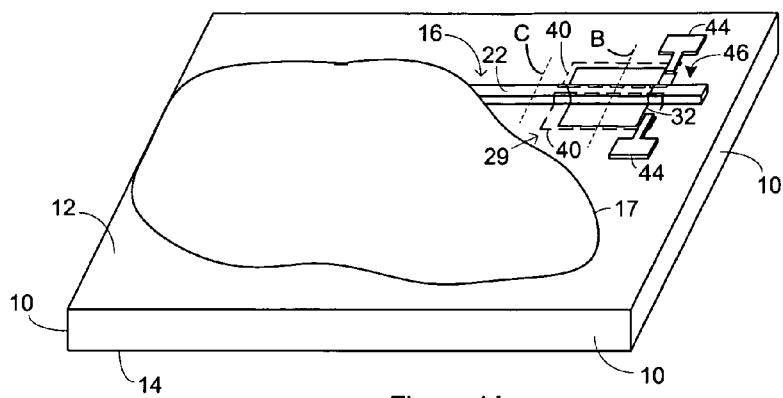

The optical device includes a light-transmitting medium on a base. The device also includes a waveguide configured to guide a light signal through the light-transmitting medium. The optical device also includes a light sensor configured to receive the light signal from the waveguide. The light sensor includes a light-absorbing medium on the base. An input side of the light light-absorbing medium is interfaced with the light-transmitting medium such that a light signal traveling toward the light sensor exits from the waveguide and enters the light-absorbing medium through the input side of the light-absorbing medium. Accordingly, the device includes an interface between the light-transmitting medium and the input side of the light-absorbing medium.

The light-absorbing medium includes doped regions that are spaced apart from one another. At least one of the doped regions extends from within the light-absorbing medium across the interface and into the light-transmitting medium. Accordingly, one or more of the doped regions can have a portion that is located in the light-absorbing medium and another portion in the light-transmitting medium.

The sensor also includes electrical conductors such as metal in electrical communication with the doped regions. During operation of the light sensor, electrical energy is applied to the electrical conductors. The electrical conductors carry the electrical energy to the doped regions. The doped regions are electrically conducting and positioned such that the electrical energy forms an electrical field between the doped regions. When the light-absorbing material absorbs a light signal, an electrical current flows between the doped regions. Electronics can use the level of this current to determine the presence and/or intensity of light in the light sensor.

At least one of the electrical conductors physically contacts the portion of a doped region that is located in the light-transmitting medium. Prior light sensors tend to have these electrical conductors contacting doped regions located in the light-absorbing medium. Further, the portion of the light-absorbing medium that was contacted by these electrical conductors was often etched before the contact with the electrical conductors was made. As noted above, the etching depth of light-absorbing media such as germanium is often difficult to control. In the prior light sensors, etching the light-absorbing medium too shallow could result in an undesirably thick slab of the light-absorbing medium. The added thickness of the light-absorbing medium reduced the speed of the light sensor. Alternately, etching the light-absorbing medium too deeply could increase the dark current associated with the light sensor. In contrast, it is easier to control the etch depth in light-transmitting media such as silicon. As a result, in the current light sensor, the electrical conductors make electrical contact with a medium having a controllable thickness. As a result, the current light sensors are associated with more consistent levels of speed and/or dark current between different devices.

Figure 1B:
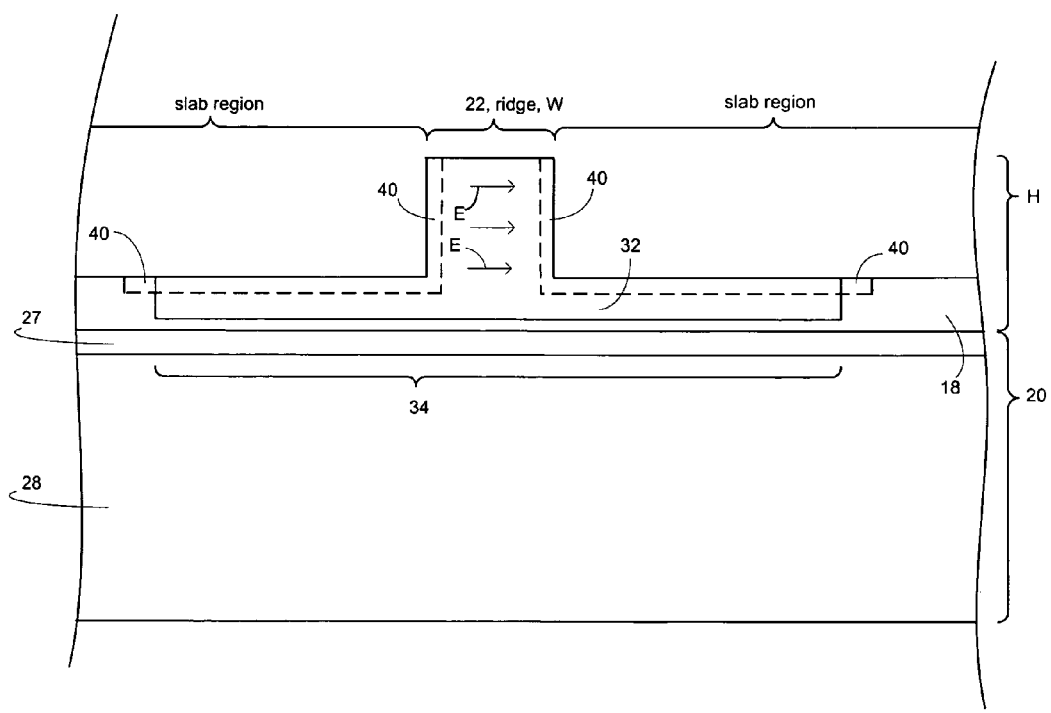

FIG. 1A through FIG. 1E illustrate an optical device having a light sensor configured to receive light signals from a waveguide. FIG. 1A is a perspective view of the device. FIG. 1B is a cross-section of the light sensor. For instance, FIG. 1B is a cross-section of the device shown in FIG. 1A taken along the line labeled B in FIG. 1A. FIG. 1C is a cross-section of the waveguide. For instance, FIG. 1C is a cross-section of the device shown in FIG. 1A taken along the line labeled C in FIG. 1A. FIG. 1D is a cross-section of the optical device shown in FIG. 1C taken along the line labeled D in FIG. 1C and extending parallel to the longitudinal axis of the waveguide. FIG. 1E is a topview of the device shown in FIG. 1A.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, light sensors that convert an light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

The waveguide 16 is defined in a light-transmitting medium 18 positioned on a base 20. For instance, the waveguide 16 is partially defined by a ridge 22 extending upward from a slab region of the light-transmitting medium. In some instances, the top of the slab region is defined by the bottom of trenches 24 extending partially into the light-transmitting medium 18 or through the light-transmitting medium 18. Suitable light-transmitting media include, but are not limited to, silicon, polymers, silica, SiN, GaAs, InP and LiNbO$_3$. One or more cladding layers are optionally positioned on the light-transmitting medium. The one or more cladding layers can serve as a cladding for the waveguide 16 and/or for the device. When the light-transmitting medium 18 is silicon, suitable cladding layers include, but are not limited to, silicon, polymers, silica, SiN, GaAs, InP and LiNbO$_3$.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be an optical insulator 27 with a lower index of refraction than the light-transmitting medium 18. The drop in the index of refraction can cause reflection of a light signal from the light-transmitting medium 18 back into the light-transmitting medium 18. The base 20 can include the optical insulator 27 positioned on a substrate 28. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the optical insulator 27 and a silicon substrate can serve as the substrate 28.

The optical device also includes a light sensor 29 configured to receive a light signal guided by the one or more waveguides 16. The light sensor 29 is configured to convert the light signal to an electrical signal. Accordingly, the light signal can be employed to detect receipt of light signals. For instance, the light sensor 29 can be employed to measure the presence of a light signal, intensity of a light signal and/or power of a light signal. Although FIG. 1A illustrates a waveguide 16 carrying the light signal between the one or more components and the light sensor 29, the device can be constructed such that the waveguide 16 carries the light signal directly from an optical fiber to the light sensor 29.

A suitable light sensor 29 includes a light-absorbing medium 32 that absorbs light signals. The light-absorbing medium 32 is positioned to receive at least a portion of a light signal traveling along the waveguide 16. As is evident in FIG. 1C, the light sensor includes a ridge 22 of light-absorbing medium 32 extending upward from a slab region of the light-absorbing medium 32. The slab regions of the light-absorbing medium 32 may be optional since the process of fabricating the sensor may include intentionally or inadvertently etching all of the way through the light-absorbing medium in these locations. In these instances, the ridge of the light-absorbing medium 32 is still present on device but the material underlying the slab regions of the light-absorbing medium 32 may be exposed and serve as the top of the device in FIG. 1B.

The ridge 22 of light-absorbing medium 32 defines a portion of a sensor waveguide that guides the light signal through the light sensor. The ridge 22 of the light-absorbing medium 32 and any slab regions of the light-absorbing medium 32 are optionally positioned on a seed portion 34 of the light-transmitting medium 18. The seed portion 34 of the light-transmitting medium 18 is positioned on the base 20 with the seed portion 34 of the light-transmitting medium 18 being between the light-absorbing medium 32 and the base 20. In some instances, the seed portion 34 of the light-transmitting medium 18 contacts the insulator 27.

The seed portion 34 of the light-transmitting medium 18 can be continuous with the light-transmitting medium 18 included in the waveguide 16 or spaced apart from the waveguide 16. When the light signal enters the light sensor, a portion of the light signal can enter the seed portion 34 of the light-transmitting medium 18 and another portion of the light signal enters the light-absorbing medium 32. Accordingly, the light-absorbing medium 32 can receive only a portion of the light signal. In some instances, the light sensor can be configured such that the light-absorbing material receives the entire light signal. When the light sensor is configured such that the seed portion of the light-transmitting medium 18 receives a portion of the light signal, the part of the seed portion that contacts the base can define a portion of the sensor waveguide. In these instances, the seed portion 34 of the light-transmitting medium 18 can act together with the light-absorbing medium to define all or a portion of the sensor waveguide.

During the fabrication of the device, the seed portion 34 of the light-transmitting medium 18 can be used to grow the light-absorbing medium 32. For instance, when the light-transmitting medium 18 is silicon and the light-absorbing medium 32 is germanium, the germanium can be grown on the silicon. As a result, the use of the light-transmitting medium 18 in both the waveguides 16 and as a seed layer for growth of the light-absorbing medium 32 can simplify the process for fabricating the device.

During operation of the light sensor 29, a reverse bias electrical field is applied across the light-absorbing medium 32. When the light-absorbing medium 32 absorbs a light signal, an electrical current flows through the light-absorbing medium 32. As a result, the level of electrical current through the light-absorbing medium 32 indicates receipt of a light signal. Additionally, the magnitude of the current can indicate the power and/or intensity of the light signal. Different light-absorbing medium 32 can absorb different wavelengths and are accordingly suitable for use in a sensor 29 depending on the function of the sensor 29. A light-absorbing medium 32 that is suitable for detection of light signals used in communications applications includes, but are not limited to, germanium, silicon germanium, silicon germanium quantum well, GaAs, and InP. Germanium is suitable for detection of light signals having wavelengths in a range of 1300 nm to 1600 nm.

The light-absorbing medium 32 includes doped regions 40 on the lateral sides of the ridge 22. In some instances, one or more of the doped regions 40 each extends from the ridge 22 into the slab region of the light-absorbing medium 32. The transition of a doped region 40 from the ridge 22 of the light-absorbing medium 32 into the slab region of the light-absorbing medium 32 can be continuous and unbroken as is evident from FIG. 1B.

Although FIG. 1B illustrates each of the doped regions extending only part way into the light-absorbing medium included in the slab regions, one or more of the doped regions can extend through the light-absorbing medium. Accordingly, one or more of the doped regions can contact the light-transmitting medium 18. Further, one or more of the doped regions can extend through the light-absorbing medium and into the light-transmitting medium 18.

Although FIG. 1B shows the doped regions formed in the slab regions of the light-absorbing medium 32, these portions of the doped regions are optional. For instance, as noted above, the slab regions of the light-absorbing medium 32 may not be present on the device. Further, the doped regions may be formed without any portion of the doped regions being present in the slab regions of the light-absorbing medium or being insubstantially present in the slab regions of the light-absorbing medium.

Each of the doped regions 40 can be an N-type doped regions or a P-type doped region. In some instances, the light-absorbing medium 32 includes a doped region 40 that is an N-type doped region and a doped region 40 that is a P-type doped region. The separation between the doped regions 40 in the light-absorbing medium 32 results in the formation of PIN (p-type region-insulator-n-type region) junction in the light sensor 29.

In the light-absorbing medium 32, suitable dopants for N-type regions include, but are not limited to, phosphorus and/or arsenic. Suitable dopants for P-type regions include, but are not limited to, boron. The doped regions 40 are doped so as to be electrically conducting. A suitable concentration for the P-type dopant in a P-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$. A suitable concentration for the N-type dopant in an N-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

FIG. 1E is a topview of the device shown in FIG. 1A. The doped regions 40 are each shown by dashed lines in order to prevent these features from being confused with other features in the drawing. As is most evident from FIG. 1E, each of the doped regions includes a first portion located in the light-absorbing medium 32 and a second portion in the light-transmitting medium 18. For instance, each of the doped regions 40 extends from within the light-absorbing medium 32, across an interface between the light-transmitting medium 18 and the light-absorbing medium at least once and, in some instances, twice or more than once. More particularly, FIG. 1E shows each of the doped regions extending from within the light-absorbing medium 32 and across the interface between an exit facet of the light-transmitting medium 18 and an input side of the light light-absorbing medium and into the light-transmitting medium; and also shows each of the doped regions extending from within the light-absorbing medium 32 and across the interface between an output side 45 of the light light-absorbing medium 32 an input facet of the light-transmitting medium 18 and into the light-transmitting medium. In each of these instances, the portion of the doped region in the light-absorbing medium 32 is continuous and in contact with the portion of the doped region in the light-transmitting medium 18. Accordingly, each of the doped regions is positioned in both the light-absorbing medium 32 and the light-transmitting medium 18.

Figure 1F:
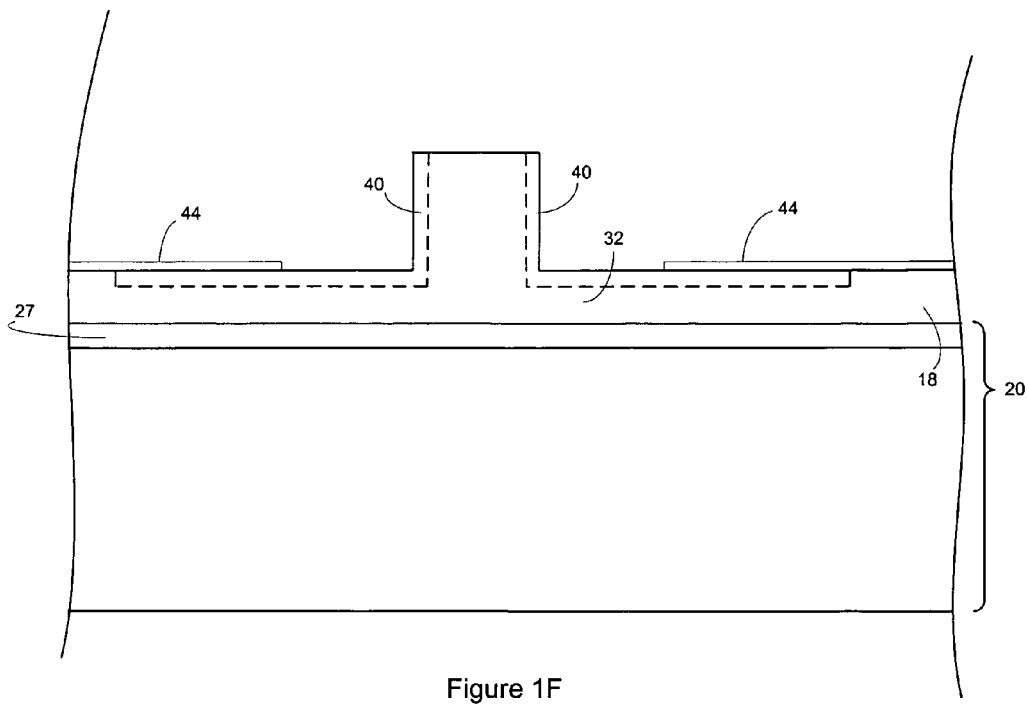

Each doped region 40 is in contact with an electrical conductor 44 on the slab region of the light-transmitting medium 18. This physical contact is best shown in FIG. 1F. FIG. 1F is a cross section of FIG. 1E taken along the line labeled F in FIG. 1E. Although not shown in FIG. 1F, as will become evident below, there can be a cladding layer between different regions of the electrical conductor and the light-transmitting medium 18. Suitable electrical conductors include wires, conducting traces such as metal traces, and other conductors such as heavily doped semiconductors. The contact between the electrical conductor and the doped region of the light-transmitting medium 18 provides electrical communication between the electrical conductor 44 and the doped region of the light-transmitting medium 18. For instance, the electrical conductor can be in direct physical contact with the doped region of the light-transmitting medium 18.

The doping level of the doped regions allows them to serve as electrical connections. Accordingly, the portion of each doped region that is in the light-transmitting medium 18 carries the electrical energy from one of the electrical conductors 44 to the portion of that doped regions in the light-absorbing medium 32. During operation of the light sensor, electronics can apply electrical energy to the electrical conductors 44 such that that the electrical s carried to the portions of the doped regions located in the light-absorbing medium 32. The electrical energy is applied so a reverse bias is applied and the electric field is formed in the light-absorbing medium 32. As is evident from the arrows labeled E in FIG. 1B, the doped regions 40 in the light-absorbing medium 32 serve as the field sources for the electrical field.

As is evident from FIG. 1E, at least one of the electrical conductors is not in contact with the portion of the doped regions that is in the slab regions of the light-absorbing medium 32. In some instances, none of the electrical conductors is in contact with the portion of the contacted doped region that is in a slab of the light-absorbing medium 32. As a result, the presence of the doped regions in the slab regions of the light-absorbing medium 32 are optional even though the doped region is present in a lateral side of the ridge of the light-absorbing medium 32 and/or the slab regions of the light-absorbing medium 32 are optional. For instance, in some instances, none of the doped regions extends into the slab regions of the light-absorbing medium 32. Further, in some instances, the slab regions of the light-absorbing medium 32 are not present next to the ridge. For instance, during the process of fabricating the light sensor, the slab regions of the light-absorbing medium 32 can be entirely etched away.

Although not illustrated, one or more of the electrical conductors can contact the light-absorbing medium 32 that are not substantially electrically conducting. For instance, one or more of the electrical conductors can contact regions of the light-absorbing medium 32 that are undoped or are lightly doped. As a result, in some instances, one or more of the electrical conductors contacts a portion of the light-absorbing medium 32.

FIG. 1A and FIG. 1E each illustrate an output waveguide 46 located after the light sensor. In some instance the light sensor is designed such that the output waveguide 46 does not receive a substantial amount of the light signal or receives none of the light signal. For instance, increasing the length of the light sensor reduces the amount of light signal received by the output waveguide 46. In some instances, the output waveguide is optional. However, the presence of an output waveguide may be an artifact of the fabrication process and/or may simplify the fabrication process. For instance, forming the output waveguide may improve the results of epitaxial growth performed during the fabrication of the device.

Figure 1G:
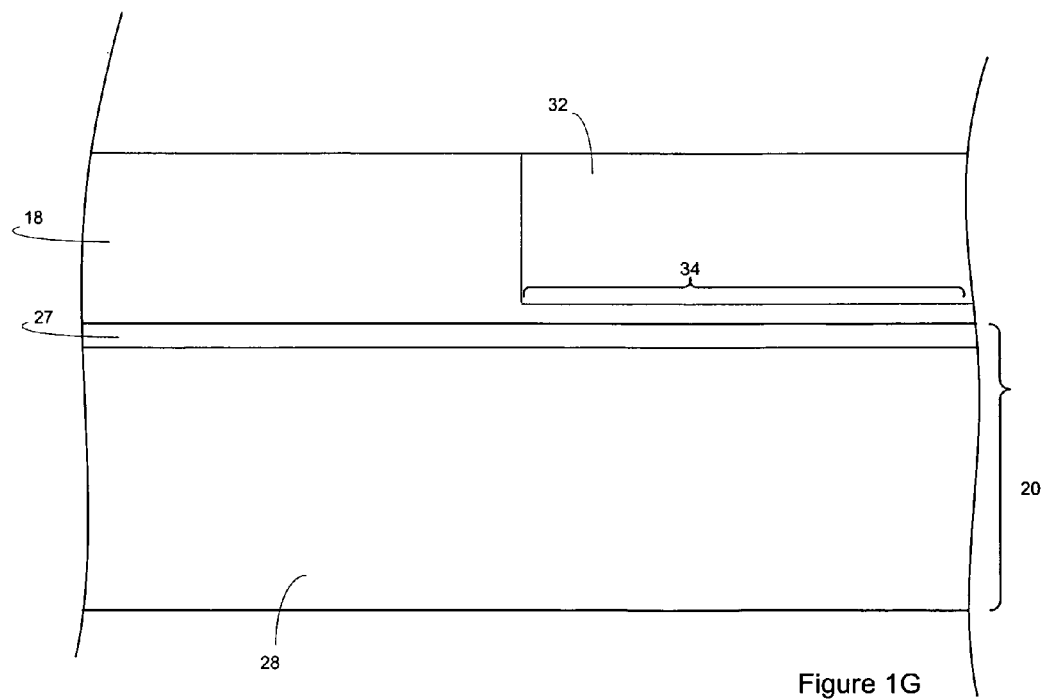

FIG. 1G is a cross section of the device shown in FIG. 1A through FIG. 1F taken along the line labeled G in FIG. 1E. FIG. 1G shows the relationship between the heights of the light-absorbing medium 32 and the light-transmitting medium 18 in the ridge and relative to the base. In some instances, the top of the light-absorbing medium 32 and the light-transmitting medium 18 are flush as shown in FIG. 1G. For instance, FIG. 1G shows the top of the light-absorbing medium 32 substantially the same distance from the base as the top of the light-transmitting medium 18. The top of the light-absorbing medium 32 need not be flush with the light-transmitting medium 18. In some instances, the top of the light-absorbing medium 32 is above the top of the light-transmitting medium 18 or the top of the light-transmitting medium 18 is above the top of the light-absorbing medium 32.

FIG. 1G also show the interface between the light-absorbing medium 32 and the light-transmitting medium 18. Although the light-absorbing medium 32 is shown directly contacting the light-transmitting medium 18, there can be one or more other layers of material positioned at this interface. For instance, there can be one or more layers that act together or individually as an anti-reflective material between the light-absorbing medium 32 and the light-transmitting medium 18.

The light sensor is suitable for use with waveguide dimensions that are suitable for use in communications applications. Accordingly, a suitable height for the waveguide 16 (labeled h in FIG. 1C) includes, but is not limited to, heights greater than 1 µm, 2 µm, and 3 µm. A suitable width for the waveguide 16 (labeled w in FIG. 1C) includes, but is not limited to, widths greater than 0.5 µm, 2 µm, and 3 µm. Suitable waveguide dimension ratios (width of the waveguide 16:height of the waveguide 16) include, but are not limited to, ratios greater than 0.15:1, 0.5:1, and 1:1 and/or less that 0.25:1, 1:1, and 2:1.

The increased dimensions of the waveguide 16 are also associated with increased dimensions of the light-absorbing medium 32. For instance, a suitable height for the waveguide in the light sensor (labeled H in FIG. 1B) includes, but is not limited to, heights greater than 1 µm, 2 µm, and 3 µm. A suitable width for the light-absorbing medium 32 (labeled W in FIG. 1B) includes, but is not limited to, widths greater than 0.5 µm, 1.5 µm, and 2 µm. Suitable light-absorbing medium 32 dimension ratios (width of the waveguide 16:height of the waveguide 16) include, but are not limited to, ratios greater than 0.15:1, 0.5:1, and 0.75:1 and/or less than 0.25:1, 0.75:1, and 1:1.

As is evident from FIG. 1A, in some instances, the interface between the input side of the light-absorbing medium 32 and the light-transmitting medium 18 has an angle that is non-perpendicular relative to the direction of propagation of light signals through the waveguide 16 at the interface. In some instances, the interface is substantially perpendicular relative to the base 20 while being non-perpendicular relative to the direction of propagation. The non-perpendicularity of the interface reduces the effects of back reflection. Suitable angles for the interface relative to the direction of propagation include but are not limited to, angles between 80° and 89°, and angles between 80° and 85°.

Figure 2:
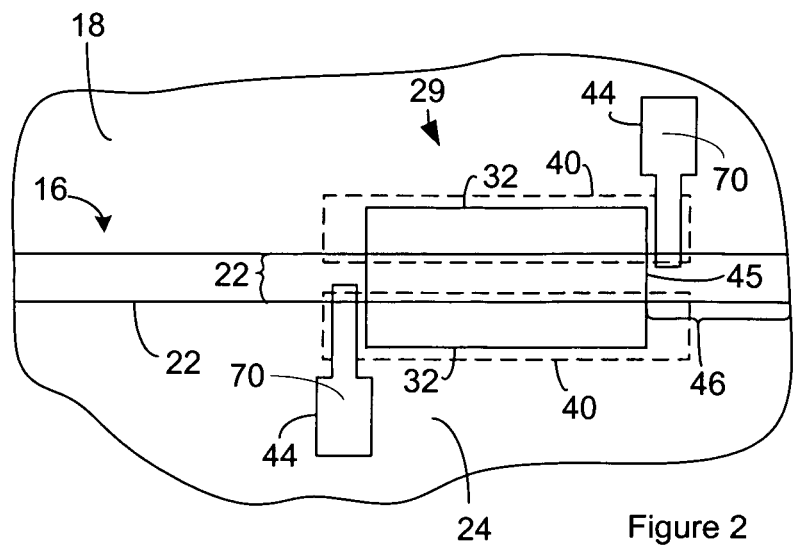
FIG. 2 is a topview of another embodiment of a light sensor constructed according to FIG. 1A through FIG. 1G.

FIG. 1A through FIG. 1G illustrate each of the electrical conductors 44 making contact with the doped regions adjacent to the input side of the light sensor. Alternately, each of the electrical conductors 44 making contact with the doped regions adjacent to the input side of the light sensor. Alternately, one of the electrical conductors 44 can make contact with one the doped regions adjacent to the input side of the light sensor and another of the electrical conductors 44 can make contact with one the doped regions adjacent to the output side of the light sensor. For instance, FIG. 2 is a topview of a light sensor constructed according to FIG. 1A through FIG. 1G but with one of the electrical conductors 44 making contact with one the doped regions adjacent to the input side of the light sensor and another of the electrical conductors 44 can make contact with one the doped regions adjacent to the output side of the light sensor. In FIG. 2, the location of the doped regions 40 is each shown by dashed lines in order to prevent these features from being confused with other features in the drawing.

The electrical conductors 44 can extend up the lateral sides of the ridge of the light-transmitting medium 18. In some instance, the electrical conductors 44 can extend up the lateral sides of the ridge of the light-transmitting medium 18 and onto the top of the light-transmitting medium 18. For instance, FIG. 2 illustrates each of the electrical conductors extending up the lateral sides of the ridge of the light-transmitting medium 18 and onto the top of ridge of light-transmitting medium 18. This arrangement increases the number of possible locations where an electrical conductor 44 can make contact with a doped region. For instance, in some instances, one or more of the electrical conductors makes contact with a doped region in at least one, or at least two, locations selected from the slab region of the light-transmitting medium 18, the portion of the doped region that is located on a lateral side of the ridge of the light-transmitting medium 18, and the portion of the doped region that is located on top of the ridge of the light-transmitting medium 18. Providing electrical contact between an electrical conductor and a portion of a doped region that is located on the ridge of the light-transmitting medium 18 can reduce the average distance that an electron travels between the electrical conductor and the location where the original photon was absorbed relative to embodiments where the electrical conductor contacts only the portion of the doped region in the slab region of the light-transmitting medium 18. In some instances, reducing this distance can decrease the resistance associated with the light sensor and can accordingly increase the speed of the light sensor.

Figure 3:
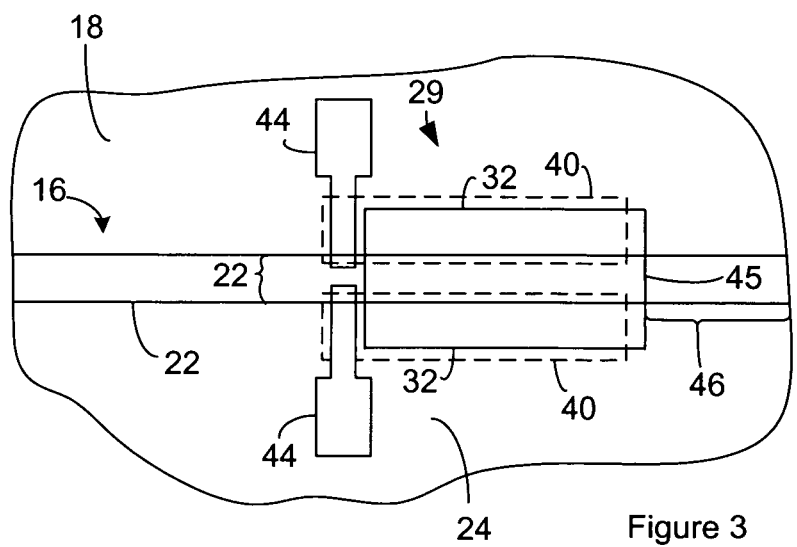
FIG. 3 is a topview of another embodiment of a light sensor constructed according to FIG. 1A through FIG. 1G.

FIG. 1A through FIG. 2 illustrate the doped regions extending across both an interface at the input side of the light light-absorbing medium and an interface at the output side 45 of the light light-absorbing medium 32. However, in some instances, one or more of the doped regions extends across only one of these interfaces. FIG. 3 is a topview of a light sensor constructed according to FIG. 1A through FIG. 1G but with each of the doped regions extending across the interface at the input side of the light light-absorbing medium but not across the interface at the output side 45 of the light light-absorbing medium 32. In FIG. 3, the location of each doped region 40 is shown by dashed lines in order to prevent these features from being confused with other features in the drawing.

FIG. 3 shows doped regions that do not extend from within the light-absorbing medium through the output side 45 of the light light-absorbing medium, and into the light-transmitting medium. More specifically, the doped regions do not extend from within the sensor waveguide into an output waveguide 46. In some instances, the light sensor is designed such that the light signal is believed to be almost completely absorbed or completely absorbed before the light signal would exit from between the doped regions. In these instance, an insubstantial portion of the light signal exits from between the doped regions 40. Accordingly, extending the doped regions 40 further toward the output side of the light light-absorbing medium would provide a source of dark current but very little photocurrent or even no photocurrent. Dark current is undesirable because it is current through the light sensor that is not a result of the light sensor receiving light. On the other hand, photocurrent is desirable since it is current through the light sensor as a result of the light sensor receiving light. As a result, in these instances, extending the doped regions 40 further toward the output side of the light light-absorbing medium could substantially decrease the performance of the light sensor.

Additionally, it may be less desirable to extend the doped regions from within the light-absorbing medium through the output side of the light light-absorbing medium because this can introduce additional uncertainty into the operation of the device. As a result, in some instances, the location of the doped regions is asymmetrical relative to the center of the length of the waveguide that is at least partially defined by the light-absorbing medium (the sensor waveguide). For instance, the distance between the end of a doped region 40 and a plane that is both perpendicular to the base at center of the sensor waveguide is longer on one side of the plane than on another side of the place as is evident from FIG. 3.

Figure 4:
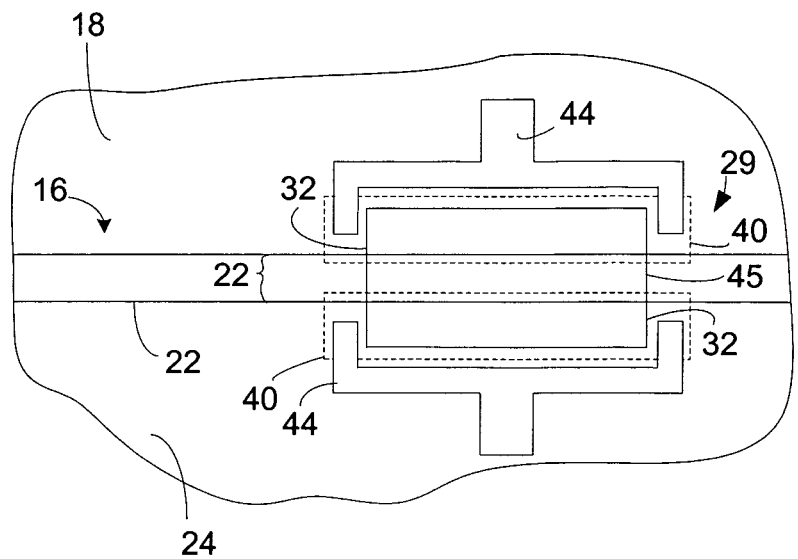
FIG. 4 is a topview of another embodiment of a light sensor constructed according to FIG. 1A through FIG. 1G.

In some instances, the device includes one or more doped regions that are each in electrical communication with the electronics at more than one location. As an example, an electrical conductor can be in contact with one of the doped regions more than once. FIG. 4 is a topview of a light sensor constructed according to FIG. 1A through FIG. 1G but with each of the doped regions being in contact with one of the electrical conductors in more than one location. In the example shown in FIG. 4, the average distance that an electron travels between the electrical conductor and the location where the original photon was absorbed is reduced relative to the above embodiments. Reducing this distance can decrease the resistance associated with the light sensor and can accordingly increase the speed of the light sensor.

Although FIG. 4 shows the electrical conductors not extending up the lateral sides of the ridge, one or more of the electrical conductors can be configured to extend up the lateral sides of the ridge as discussed in the context of FIG. 2.

As noted above, the slab regions of the light-absorbing medium 32 are optional in each of the above light sensors and/or the portion of the doped regions shown above as being in the slab regions of the light-absorbing medium 32 are optional. When the slab regions of the light-absorbing medium 32 are not present, the portion of the doped regions 40 that is in these slab regions is also not present. The presence of the doped regions in the slab regions of the light-absorbing medium 32 is a source of dark current. As a result, a source of dark current is removed when the portion of the doped regions shown above as being in the slab regions of the light-absorbing medium 32 are not present.

When the portion of the doped regions that are located in the slab regions of the light-absorbing medium 32 are not present in the light sensor of FIG. 1E, FIG. 2, FIG. 3, or FIG. 4, the part of the image representing the portion of a doped regions located in the slab regions of the light-absorbing medium 32 could instead represent he underlying seed portion 34 of the light-transmitting medium 18 or the base 20. When the base 20 is represented, the part of the image representing the portion of a doped regions located in the slab regions of the light-absorbing medium 32 could instead represent the optical insulator 27 or the substrate 28.

Figure 5A:
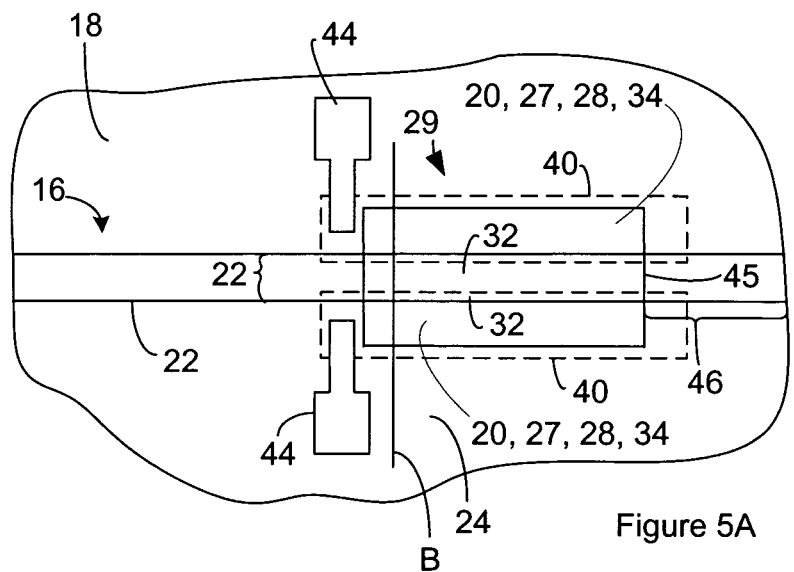
FIG. 5A is a topview of another embodiment of a light sensor constructed according to FIG. 1A through FIG. 1G.

FIG. 5A illustrates an example of the light sensor construction when the slab regions of the light-absorbing medium 32 are not present in the light sensor of FIG. 1A through FIG. 1G.

More particularly, FIG. 5A is a topview of a light sensor constructed according to FIG. 1A through FIG. 1G but without the slab regions formed in the light-absorbing medium 32. For instance, during the fabrication of the light sensor, one or more etches may etch entirely through the light-absorbing medium 32 exposing the underlying seed portion 34 of the light-transmitting medium 18 or the base 20. When the base is exposed, the optical insulator 27 may be exposed or the one or more etches may go through the optical insulator 27 to expose the substrate 28. As a result, the locations where the slab regions of the light-absorbing medium 32 are normally positioned are labeled 34, 20, 27, or 28 in FIG. 5A.

Figure 5B:
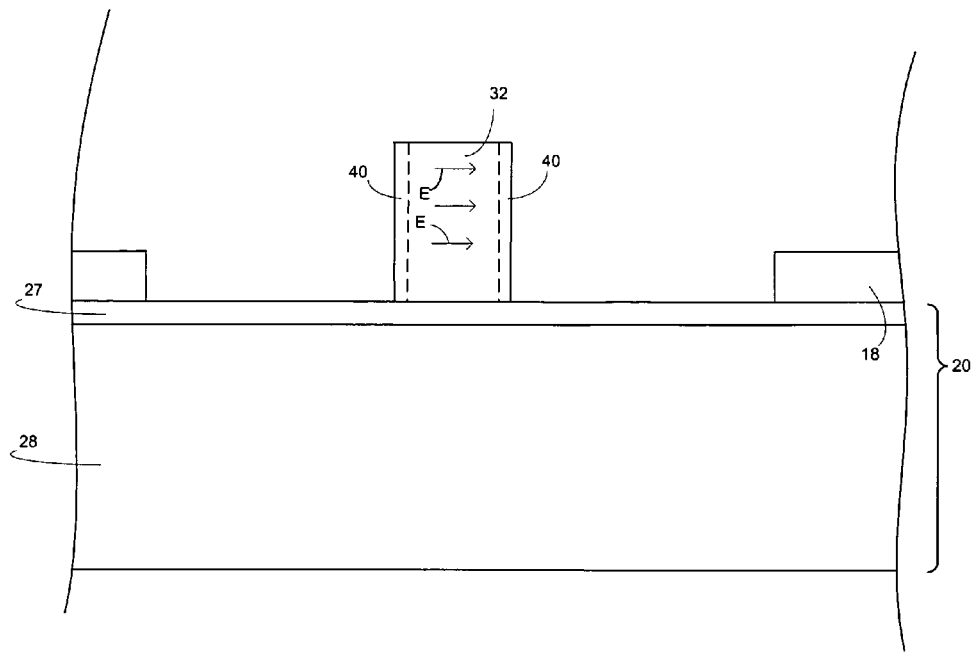
FIG. 5B is a cross section of the light sensor shown in FIG. 5A taken along the line labeled B in FIG. 5A.

FIG. 5B is a cross section of the light sensor shown in FIG. 5A taken along the line labeled B in FIG. 5A. The light sensor of FIG. 5B illustrates the case where the slab regions of the light-absorbing medium 32 have been etched away down to the level of the optical insulator 27. Accordingly, the seed portion 34 of the light-transmitting medium 18 is not evident in FIG. 5B. In this embodiment, the ridge of the light-absorbing medium 32 extends upwards from the base rather than from the slab regions of the light-absorbing medium 32. In particular, the ridge of the light-absorbing medium 32 extends upwards from the insulator 27.

Although FIG. 5A and FIG. 5B illustrate the light sensor of FIG. 1A through FIG. 1G without the slab regions of the light-absorbing medium 32, in some instances, the device includes the light sensors of FIG. 2 through FIG. 4 constructed without the slab regions of the light-absorbing medium 32.

Figure 6:
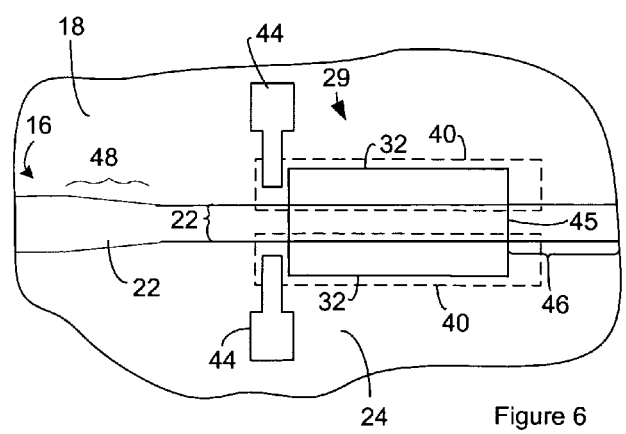
FIG. 6 is a topview of an optical device having a waveguide 16 optically located before a light sensor.

In some instances, the waveguide 16 includes one or more tapers located before the light sensor. For instance, FIG. 6 is a topview of an optical device where the waveguide 16 includes a taper 48. The taper 48 can be a horizontal taper and need not include a vertical taper although a vertical taper is optional. The taper 48 is positioned before the light sensor. For instance, the horizontal taper occurs in the light-transmitting medium 18 rather than in the light-absorbing medium 32. The taper 48 allows the light-absorbing medium 32 to have a narrower width than the waveguide 16. The reduced width of the light-absorbing medium 32 increases the speed of the light sensor. Although the taper of FIG. 6 does not include a vertical taper, in some instances, the taper includes a vertical taper. The optical component preferably excludes additional components between the taper and light sensor although other components may be present.

The optical device can be constructed using fabrication technologies that are employed in the fabrication of integrated circuits, optoelectronic circuits, and/or optical devices. For instance, the ridge 22 for the waveguide 16 and/or the seed portion 34 can be formed in the light-transmitting medium 18 using etching technologies on a silicon-on-insulator wafer. Horizontal tapers can be readily formed using masking and etching technologies. Suitable methods for forming vertical tapers are disclosed in U.S. patent application Ser. No. 10/345,709, filed on Jan. 15, 2003, entitled "Controlled Selectivity Etch for Use with Optical Component Fabrication," and incorporated herein in its entirety.

FIG. 7A through FIG. 13C illustrate a method of generating an optical device constructed according to FIG. 1A through FIG. 1G but with an angled interface as show in FIG. 1A. The method is illustrated using a silicon-on-insulator wafer or chip as the starting precursor for the optical device. However, the method can be adapted to platforms other than the silicon-on-insulator platform.

Figure 7A:
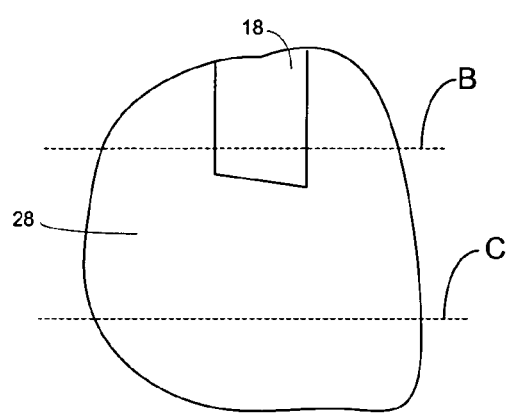
Figure 7B:
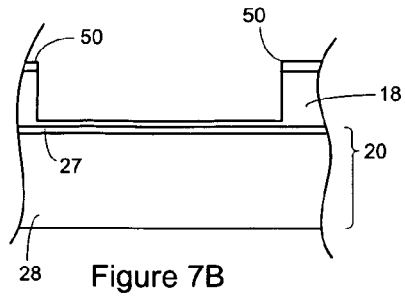
Figure 7C:
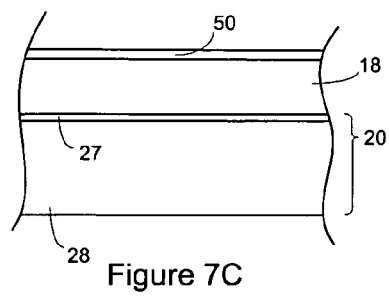

FIG. 7A through FIG. 7C illustrate a first mask 50 formed on the silicon-on-insulator wafer or chip to provide a device precursor. FIG. 7A is a topview of the device precursor. FIG. 7B is a cross-section of the device precursor shown in FIG. 7A taken along the line labeled B. FIG. 7C is a cross-section of the device precursor shown in FIG. 7A taken along the line labeled C. The first mask 50 leaves exposed a region of the device precursor where a sensor cavity 52 is to be formed while the remainder of the illustrated portion of the device precursor is protected. The sensor cavity 52 is the region of the device precursor where the light-absorbing medium 32 is to be formed. A first etch is then performed so as to form the sensor cavity 52. The first etch yields the device precursor of FIG. 7A through FIG. 7C. The first etch is performed such that the seed portion 34 of the light-transmitting medium 18 remains on the base 20. Accordingly, the first etch is terminated before the base 20 is reached.

A suitable first mask 50 includes, but is not limited to, a hard mask such as a silica mask. A suitable first etch includes, but is not limited to, a dry etch.

Figure 8A:
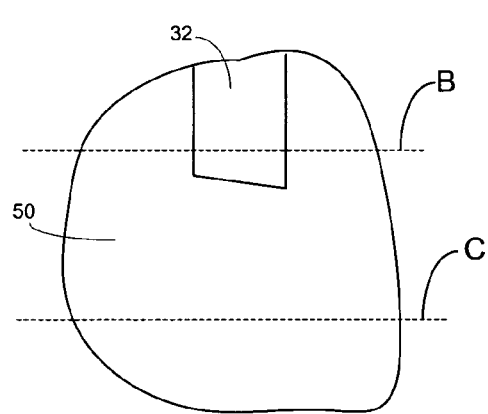
Figure 8B:
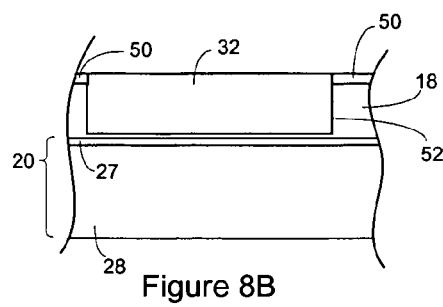
Figure 8C:
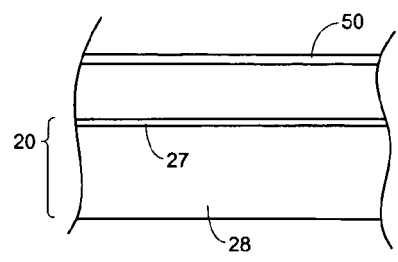

As shown in FIG. 8A through FIG. 8C, the light-absorbing medium 32 is formed in the sensor cavity 52 of FIG. 7A through FIG. 7C. FIG. 8A is a topview of the device precursor. FIG. 8B is a cross-section of the device precursor shown in FIG. 8A taken along the line labeled B. FIG. 8C is a cross-section of the device precursor shown in FIG. 8A taken along the line labeled C. When the light-transmitting medium 18 is silicon and the light-absorbing medium 32 is germanium, the germanium can be grown on the seed portion 34 of the silicon. After formation of the light light-absorbing medium 32, the device precursor can be planarized to provide the device precursor of FIG. 8A through FIG. 8C.

The first mask 50 can be removed from the device precursor of FIG. 8A through FIG. 8C and a second mask 54 can be formed on the device precursor so as to provide the device precursor of FIG. 9A through FIG. 9C. FIG. 9A is a topview of the device precursor. FIG. 9B is a cross-section of the device precursor shown in FIG. 9A taken along the line labeled B. FIG. 9C is a cross-section of the device precursor shown in FIG. 9A taken along the line labeled C. The second mask 54 is formed such that the regions where the trenches 24 are to be formed remain exposed while protecting the remainder of the illustrated portion of the device precursor. A suitable second mask 54 includes a hard mask such as a silica mask.

A second etch is performed on the device precursor of FIG. 9A through FIG. 9C to provide the device precursor of FIG. 10A through FIG. 10C. FIG. 10A is a topview of the device precursor. FIG. 10B is a cross-section of the device precursor shown in FIG. 10A taken along the line labeled B. FIG. 10C is a cross-section of the device precursor shown in FIG. 10A taken along the line labeled C. The second etch is stopped when the depth of the trenches 24 in the light-transmitting medium 18 has reached the desired depth. In many instances, the light-absorbing medium 32 etches more quickly than the light-transmitting medium 18. As a result, FIG. 10B shows the slab regions formed in the light-absorbing medium 32 being thinner than the slab regions formed in the light-transmitting medium 18. A suitable second etch includes, but is not limited to, a dry etch that can etch both the light-transmitting medium 18 and the light-absorbing medium 32.

Figure 11A:
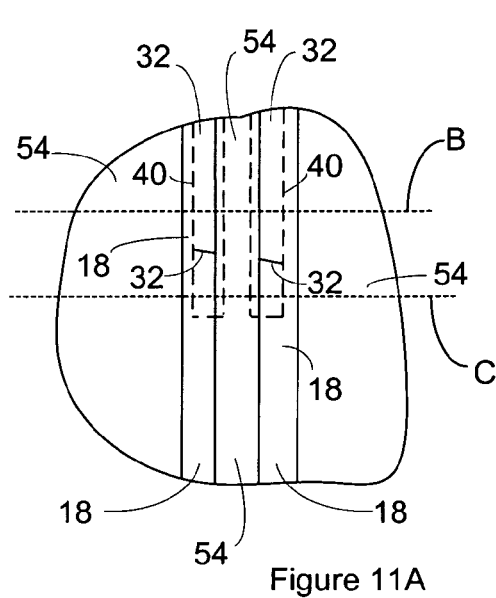
Figure 11B:
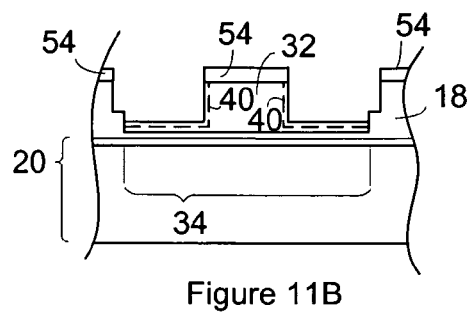
Figure 11C:
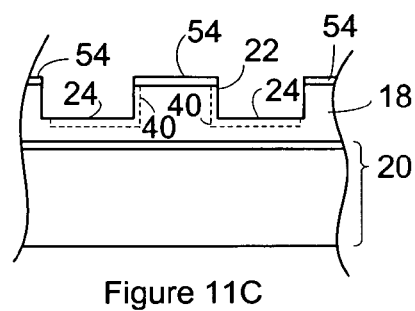

The doped regions 40 are formed in the light-transmitting medium 18 and in the light-absorbing medium 32 so as to provide the device precursor of FIG. 11A through FIG. 11C. FIG. 11A is a topview of the device precursor. FIG. 11B is a cross-section of the device precursor shown in FIG. 11A taken along the line labeled B. FIG. 11C is a cross-section of the device precursor shown in FIG. 11A taken along the line labeled C. Because the doped regions overlap several different features on the precursor, in FIG. 11A, the locations of the doped regions are shown by dashed lines so they can be distinguished from the overlapped features.

The n-type doped regions can be generated by forming a doping mask on the device precursor so the locations of the n-type doped regions are exposed and the remainder of the illustrated portion of the device precursor is protected. High angle dopant implant processes can be employed to form the n-type doped regions. The doping mask can then be removed. The same sequence can then be employed to form the p-type doped regions. The p-type doped regions can be formed before the n-type doped regions or the n-type doped regions can be formed before the p-type doped regions.

During the process of forming the doped regions, in some instances, the portion of each doped region located in the light-transmitting medium 18 is formed concurrently with the portion of the doped region located in the light-absorbing medium 32 rather than the two different portions being formed sequentially. As a result, in some instances, for each of the doped regions, the portion of the doped region in the light-transmitting medium 18 has the same concentration of dopant, or about the same concentration, as the portion of the doped region in the light-absorbing medium 32.

Figure 12A:
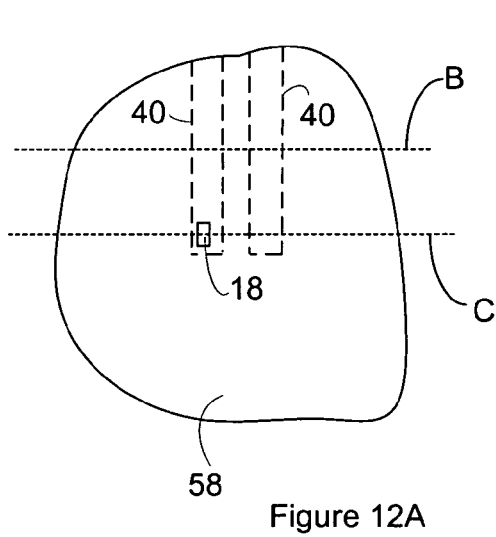
Figure 12B:
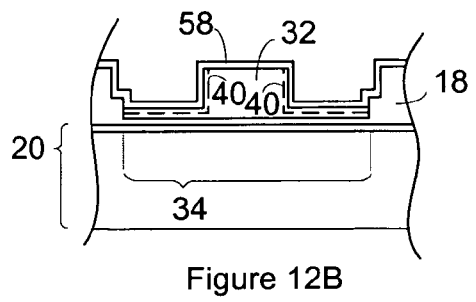
Figure 12C:
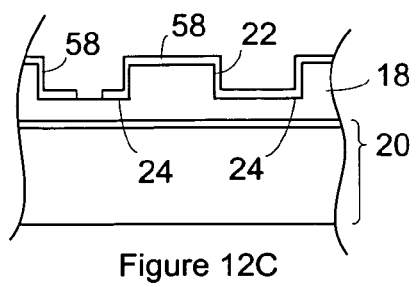

The second mask 54 is removed from the device precursor of FIG. 11A through FIG. 11C and a first cladding 58 is formed on the device precursor so as to provide the device precursor of FIG. 12A through FIG. 12C. FIG. 12A is a topview of the device precursor. Although the location of the light-absorbing medium 32 is not visible from above the device precursor of FIG. 12A, the light-absorbing medium 32 is illustrated as a dashed line in order to show the spatial relationship between features on the device precursor. FIG. 12B is a cross-section of the device precursor shown in FIG. 12A taken along the line labeled B. FIG. 12C is a cross-section of the device precursor shown in FIG. 12A taken along the line labeled C. As is evident in FIG. 12A and FIG. 12B, the first cladding 58 is formed such that the portion of the doped regions 40 that are to be contacted by the electrical conductors 44 remain exposed and the remainder of the illustrated portion of the device precursor are protected by the first cladding 58. A suitable first cladding 58 includes, but is not limited to, PECVD deposited silica that is subsequently patterned using photolithography.

The electrical conductors 44 are formed on the device precursor of FIG. 12A and FIG. 12C so as to provide the device precursor of FIG. 13A through FIG. 13C. FIG. 13A is a topview of the device precursor. Although the location of the light-absorbing medium 32 is not visible from above the device precursor of FIG. 13A, the light-absorbing medium 32 is illustrated as a dashed line in order to show the spatial relationship between features on the device precursor. FIG. 13B is a cross-section of the device precursor shown in FIG. 13A taken along the line labeled B. FIG. 13C is a cross-section of the device precursor shown in FIG. 13A taken along the line labeled C. As is evident in FIG. 13A and FIG. 13B, the electrical conductors 44 can be formed so each electrical conductor 44 extend from one of the doped regions 40, out of the trench 24, and over the light-transmitting medium 18. Suitable electrical conductors 44 include metals such as titanium and aluminum. The metals can be deposited by sputtering and patterned by photolithography.

A second cladding can optionally be formed on the device precursor of FIG. 13A through FIG. 13C. The second cladding can optionally be patterned such that the second cladding defines contact pads 70 on the electrical conductors 44. A suitable second cladding includes, but is not limited to, PECVD deposited SiN that is subsequently patterned using photolithography. After removing photoresists formed during photolithography, the device precursor can be sintered to form the optical device.

The device can be used in conjunction with electronics that are in electrical communication with the contact pads. The electronics can apply electrical energy to the contact pads so as to form a reverse bias across the PIN junction in the light sensor. When the light-absorbing medium 32 receives a light signal, an electrical current flows through the light-absorbing medium 32 indicating the receipt of the light signal.

Although the method of FIG. 7A through FIG. 13C discloses fabrication of a light sensor according to FIG. 2, the method is adapted to fabrication of light sensors according to FIG. 1A through FIG. 1C and FIG. 3 through FIG. 4 by changing the location(s) of the doped regions, electrical conductors, and/or location(s) where the electrical conductors contact the doped regions.

Additionally, the method is adapted to fabrication of light sensors according to FIG. 5A through FIG. 5B by changing the depth of the second etch. For instance, when the second etch is performed on the device precursor of FIG. 9A through FIG. 9C, the second etch can be performed such that the second etch etches through the exposed the light-absorbing medium 32. As a result, the second etch produces a device precursor according to FIG. 14A through FIG. 14C. FIG. 14A is a topview of the device precursor. FIG. 14B is a cross-section of the device precursor shown in FIG. 14A taken along the line labeled B. FIG. 14C is a cross-section of the device precursor shown in FIG. 14A taken along the line labeled C. In these instances, the slab regions formed in the light-absorbing medium 32 of FIG. 10B are not present. Additionally, either the seed portion 34 of the light-transmitting medium 18, the insulator 27, or the substrate 28 are exposed depending on the depth of the second etch. In the embodiment illustrated in FIG. 14A through FIG. 14C, the second etches is performed such that it etches through the slab regions of in the light-absorbing medium 32 and also through the seed portion 34 of the light-transmitting medium 18. As a result, the insulator 27 is exposed as shown in FIG. 14B.

Figures 15A, 15B, 15C:
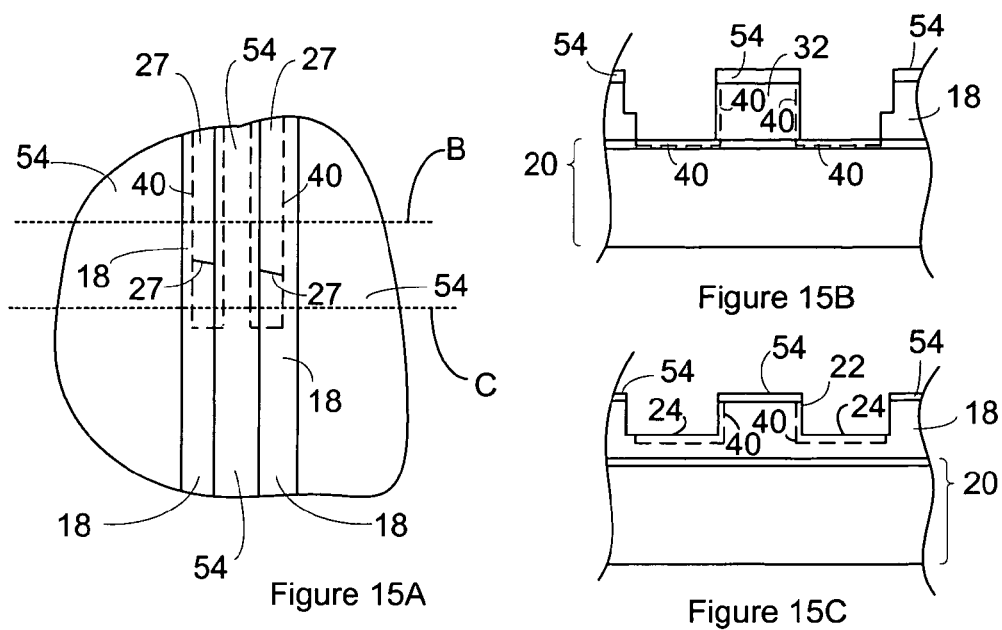

The doped regions 40 are formed in the light-transmitting medium 18 and in the light-absorbing medium 32 so as to provide the device precursor of FIG. 15A through FIG. 15C. FIG. 15A is a topview of the device precursor. FIG. 15B is a cross-section of the device precursor shown in FIG. 15A taken along the line labeled B. FIG. 15C is a cross-section of the device precursor shown in FIG. 15A taken along the line labeled C. Because the doped regions overlap several different features on the precursor, in FIG. 15A, the locations of the doped regions are shown by dashed lines so they can be distinguished from the overlapped features.

As is evident from FIG. 15B, the insulator 27 receives some of the dopant. However, in the case of insulators such as silica, the dopant does not cause the insulator to become substantially electrically conducting. As a result, in general, the presence of the dopant in an insulator such as silica does not substantially affect the performance of the device. In instances where the presence of the dopant in the insulator 27 affects the performance of the device and/or are not desired, the doped portion of the insulator 27 can be removed using a wet etch. For instance, when a silicon-on-insulator wafer is used as the platform, it may not be desirable for the second etch to expose the underlying silicon substrate because the exposed portion of the substrate may become doped and undesirably electrically conducting. In these instances, it may be desirable to remove the doped portion of the silicon substrate.

Light sensors such as is discussed in the context of FIG. 5A and FIG. 5B can be generated by applying the acts disclosed in the context of FIG. 12A through FIG. 13C to the device precursor of FIG. 15A through FIG. 15C.

Although the above masks are described as the first mask, second mask, etc., the number first, second, and third does not indicate sequence but instead provides an identifier that indicates different masks. As a result, it may be possible to generate the desired device by forming a mask with a higher number before forming the lower numbered mask.

Although the light sensor is described as being operated with a reverse bias applied across the light sensor, the light sensor can be operated as a light sensor under other conditions. For instance, the lights sensor can be operated with a zero bias. As an example, the light sensor can be operated in a photovoltaic mode.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
   an input waveguide on a base, the input waveguide configured to guide a light signal through a light-transmitting medium to a light sensor; and
   the light sensor including
      a sensor waveguide on the base, the sensor waveguide including a light-absorbing medium that receives the light signal from the input waveguide,
         the light-transmitting medium and the light-absorbing medium being different materials,
         the light-absorbing medium including one or more continuous doped regions that are each positioned such that an application of electrical energy to the doped regions forms an electrical field in the light-absorbing medium,
      one or more of the doped regions being a utility doped region, the one or more utility doped regions each having a portion of the utility doped region being located within the light-absorbing medium and another portion located outside of the light-absorbing medium; and
      an electrical conductor for applying the electrical energy to the doped regions, the electrical conductor contacting the portion of one of the utility doped regions that is located outside of the light-absorbing medium.

2. The device of claim 1, wherein the sensor waveguide includes a ridge of the light-absorbing medium extending upward from the base.

3. The device of claim 2, wherein the light-absorbing medium does not extend outward from the ridge at the base of the ridge.

4. The device of claim 1, wherein the sensor waveguide is at least partially defined by a ridge in the light-absorbing medium, and each of the doped regions is included in a lateral side of the ridge in the light-absorbing medium.

5. The device of claim 4, wherein the input waveguide is at least partially defined by a ridge in the light-transmitting medium, and each of the doped regions is included in a lateral side of the ridge in the light-transmitting medium.

6. The device of claim 5, wherein the electrical conductor contacts the portion of one of the doped regions that is included in the lateral side of the ridge in the light-transmitting medium.

7. The device of claim 1, wherein the light-transmitting medium includes a ridge extending upward from slabs of the light-transmitting medium, the ridge defining at least a portion of the input waveguide.

8. The device of claim 7, wherein at least one of the utility doped regions is included in one of the slabs of the light-transmitting medium.

9. The device of claim 8, wherein the electrical conductor contacts one of the utility doped regions, the contact being at a location that is in one of the slabs of the light-transmitting medium.

10. The device of claim 1, wherein the light sensor includes a portion of the light-transmitting medium located between the light-absorbing medium and the base.

11. The device of claim 9, wherein the portion of the light-transmitting medium located between the light-absorbing medium and the base is continuous with the light-transmitting medium located outside of the light sensor.

12. The device of claim 9, wherein the portion of the light-transmitting medium located between the light-absorbing medium receives a portion of the light signal entering the light sensor.

13. The device of claim 1, wherein an output side of the light-absorbing medium is interfaced with an input facet of the light-transmitting medium, and
   the output side of the light-absorbing medium is located such that the direction of propagation of the light signal within the sensor waveguide passes through the output side of the output side of the light-absorbing medium, and
   the one or more utility doped regions do not extend from within the light-absorbing medium to the output side of the light-absorbing medium.

14. The device of claim 1, wherein each of the utility doped regions has a concentration of a dopant and the concentration of the dopant in the portion of the utility doped region outside of the light-absorbing medium is the same as the concentration of the dopant in the portion of the utility doped region located in the light-absorbing medium.

15. The device of claim 1, wherein the light-absorbing medium includes a plurality of the utility doped regions and the utility doped regions are spaced apart from one another.

16. The device of claim 15, wherein the light-absorbing medium includes lateral sides between a top and a bottom side,
   the bottom side being between the top side and the base, and
   the utility doped regions each being included in one of the lateral sides.

17. The device of claim 16, wherein each of the utility doped regions has a concentration of a dopant and the concentration of the dopant in the portion of the utility doped region outside of the light-absorbing medium is the same as the concentration of the dopant in the portion of the utility doped region located in the light-absorbing medium.

18. The device of claim 17, wherein the portion of each utility doped region outside of the light-absorbing medium is located in the light-transmitting medium.

19. The device of claim 18, wherein an output side of the light-absorbing medium is interfaced with an input facet of the light-transmitting medium, and
   the output side of the light-absorbing medium is located such that the direction of propagation of the light signal within the sensor waveguide passes through the output side of the output side of the light-absorbing medium, and the one or more utility doped regions do not extend from within the light-absorbing medium to the output side of the light-absorbing medium.

* * * * *